United States Patent
Takashima et al.

(10) Patent No.: US 12,111,655 B2
(45) Date of Patent: Oct. 8, 2024

(54) MULTIFUNCTIONAL VEHICLE WITH REMOTE DRIVING FUNCTION AND REMOTE DRIVING METHOD

(71) Applicant: TOYOTA JIDOSHA KABUSHIKI KAISHA, Toyota (JP)

(72) Inventors: Toru Takashima, Susono (JP); Takahiro Ogawa, Okazaki (JP); Kenji Tadakuma, Toyota (JP); Keisuke Miwa, Toyota (JP); Shuichi Tamagawa, Kitanagoya (JP); Takahiro Okano, Chiryu (JP); Shun Ota, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 17/805,058

(22) Filed: Jun. 2, 2022

(65) Prior Publication Data
US 2023/0057919 A1   Feb. 23, 2023

(30) Foreign Application Priority Data
Aug. 18, 2021 (JP) .............................. 2021-133595

(51) Int. Cl.
*G05D 1/00* (2024.01)
*B60W 10/04* (2006.01)
(Continued)

(52) U.S. Cl.
CPC ........... *G05D 1/0038* (2013.01); *B60W 10/04* (2013.01); *B60W 10/18* (2013.01); *B60W 10/20* (2013.01);
(Continued)

(58) Field of Classification Search
CPC ... G05D 1/0038; G05D 1/0016; B60W 10/04; B60W 10/18; B60W 10/20; B60W 50/14;
(Continued)

(56) References Cited

U.S. PATENT DOCUMENTS
2021/0109515 A1\* 4/2021 Urano .................. G05D 1/0027

FOREIGN PATENT DOCUMENTS
JP        09027971 A  \*  1/1997
JP    H09-027971 A      1/1997
(Continued)

OTHER PUBLICATIONS

JP 09027971—translation (Year: 1997).\*
JP-2019194810-A—translation (Year: 2019).\*
WO-2017125788-A1—translation (Year: 2017).\*

*Primary Examiner* — Ian Jen
*Assistant Examiner* — Renee LaRose
(74) *Attorney, Agent, or Firm* — Finnegan, Henderson, Farabow, Garrett and Dunner, LLP

(57) ABSTRACT

A multifunctional vehicle includes a traveling input device that is operated by a driver of the multifunctional vehicle; an information processing device that processes operation information of the traveling input device and that switches and executes a normal driving mode for driving the multifunctional vehicle and a remote driving mode for driving the other vehicle; wearable glasses that communicate with another vehicle directly or via the information processing device; and a communication device that communicate with the other vehicle. In the normal driving mode, a vehicle control of the multifunctional vehicle is executed using control information generated based on the operation information. In the remote driving mode, the control information is transmitted to the other vehicle via the communication device. The wearable glasses are configured to display a surrounding image of the other vehicle during execution of
(Continued)

the remote driving mode by the information processing device.

5 Claims, 7 Drawing Sheets

(51) Int. Cl.
*B60W 10/18* (2012.01)
*B60W 10/20* (2006.01)
*B60W 50/14* (2020.01)
*B60W 60/00* (2020.01)

(52) U.S. Cl.
CPC .......... *B60W 50/14* (2013.01); *B60W 60/001* (2020.02); *B60W 2050/146* (2013.01); *B60W 2556/65* (2020.02)

(58) Field of Classification Search
CPC ......... B60W 60/001; B60W 2050/146; B60W 2556/65
See application file for complete search history.

(56) References Cited

FOREIGN PATENT DOCUMENTS

| | | | |
|---|---|---|---|
| JP | 2004-295360 A | | 10/2004 |
| JP | 2019194810 A | * | 11/2019 |
| JP | 2021-064118 A | | 4/2021 |
| WO | WO-2017125788 A1 | * | 7/2017 |

\* cited by examiner

MULTIFUNCTIONAL VEHICLE WITH REMOTE DRIVING FUNCTION AND REMOTE DRIVING METHOD

CROSS-REFERENCE TO RELATED APPLICATION

This application claims priority to Japanese Patent Application No. 2021-133595 filed on Aug. 18, 2021, incorporated herein by reference in its entirety.

BACKGROUND

1. Technical Field

The present disclosure relates to a multifunctional vehicle with an autonomous traveling function and a function of remotely driving another vehicle, and a remote driving method using the same.

2. Description of Related Art

Japanese Unexamined Patent Application Publication No. 2004-295360 (JP 2004-295360 A) discloses a device that remotely drives a vehicle. This device in the related art is provided in a control center that communicates with the vehicle. This device in the related art also includes a control device, a display, a driver's seat, various sensors, and the like. An image from a camera of the vehicle is output to the display. The driver's seat has a configuration similar to a configuration of a driver's seat of an actual vehicle. A remote operator sitting in the driver's seat operates an input device, such as a steering wheel, an accelerator pedal, and a brake pedal, while looking at a camera image output on the display. The various sensors detect an operation amount of the input device by the remote operator. The control device calculates a control amount of a traveling device, such as a steering device, a driving device, and a brake device of the vehicle based on this operation amount.

SUMMARY

A general vehicle is usually provided with various configurations for a driver to drive the vehicle. Therefore, remote driving of another vehicle using a typical configuration of the general vehicle (for example, a privately owned vehicle POV) is considered. In this case, the driver of the general vehicle is a remote operator who operates an input device of the vehicle to drive the vehicle in a remote location. In a specific case, the driver operates the input device of his/her vehicle to act as the remote operator to transport a passenger getting on a vehicle, such as a taxi and a hired car, present in a remote location.

Note that, in order to realize a remote driving service utilizing such the typical configuration of the general vehicle, it is needed to enhance an operation environment of the input device of the vehicle on a remote driving side. In particular, in order to secure the safety of the vehicle on a remotely driven side, it is needed to sufficiently secure a visual sense of the driver who gets on the vehicle on the remote driving side. In addition, it is needed to improve the vehicle such that the vehicle on the remote driving side does not autonomously travel during the implementation of the remote driving service and unneeded information is not transmitted to a pedestrian and the like around this vehicle.

The present disclosure is to provide a technique capable of realizing a remote driving service utilizing a typical configuration of a general vehicle.

A first aspect of the disclosure relates to a multifunctional vehicle with an autonomous traveling function and a function of remotely driving another vehicle, and has the following features.

The multifunctional vehicle includes a traveling input device, an information processing device, wearable glasses, and a communication device. The traveling input device is operated by a driver of the multifunctional vehicle. The information processing device is configured to process operation information of the traveling input device by the driver. The wearable glasses are worn by the driver. The wearable glasses are configured to communicate with the other vehicle by at least one of direct communication with the other vehicle and indirect communication via the information processing device. The communication device is configured to communicate with the other vehicle.

The information processing device is configured to switch and execute a normal driving mode for driving the multifunctional vehicle and a remote driving mode for driving the other vehicle. In the normal driving mode, a vehicle control of the multifunctional vehicle is executed using control information generated based on the operation information. In the remote driving mode, the control information is transmitted to the other vehicle via the communication device.

The wearable glasses are configured to display a surrounding image of the other vehicle acquired by at least one of the direct communication and the indirect communication with the other vehicle during execution of the remote driving mode by the information processing device.

A second aspect of the disclosure further has the following features in the first aspect of the disclosure.

The multifunctional vehicle may further include a driving device, a brake device, and a steering device.

The traveling input device may include an accelerator pedal, a brake pedal, a steering wheel, and a shift lever.

The driving device and the accelerator pedal may constitute a drive-by-wire. The brake device and the brake pedal may constitute a brake-by-wire. The steering device and the steering wheel may constitute a steer-by-wire. The shift lever may constitute a shift lever-by-wire.

A third aspect of the disclosure further has the following features in the first or second aspect of the disclosure.

The multifunctional vehicle may further include a traveling assist device and a switch. The traveling assist device may be configured to assist traveling of the multifunctional vehicle. The switch may be operated by the driver of the multifunctional vehicle. The switch may operate the traveling assist device.

In the normal driving mode, operation instruction information from the switch may be output to the traveling assist device. In the remote driving mode, the operation instruction information may be transmitted to the other vehicle via the communication device.

A fourth aspect of the disclosure further has the following features in any one of the first to third aspects of the disclosure.

The surrounding image may include a front image, a left front image, and a right front image of the other vehicle.

The wearable glasses may be configured to execute a head tracking control of generating an image displayed on the wearable glasses in accordance with movement of a head of the driver based on the surrounding image during the execution of the remote driving mode.

A fifth aspect of the disclosure relates to a method of remotely driving another vehicle using a multifunctional vehicle with an autonomous traveling function and a function of remotely driving the other vehicle, and has the following features.

The method includes a step of setting a driving mode of the multifunctional vehicle to a remote driving mode for driving the other vehicle, a step of displaying a surrounding image of the other vehicle acquired by at least one of direct communication and indirect communication with the other vehicle on wearable glasses worn by a driver of the multifunctional vehicle while the driving mode is set to the remote driving mode, and a step of transmitting control information generated based on operation information of a traveling input device operated by the driver to the other vehicle while the driving mode is set to the remote driving mode.

According to the first or fifth aspect of the disclosure, in the multifunctional vehicle in which the wearable glasses are added to a typical configuration for realizing the autonomous traveling function, the remote driving of the other vehicle based on switching of the driving mode is executed. Therefore, it is possible to remotely drive the other vehicle by utilizing the typical configuration of a general vehicle.

According to the second aspect of the disclosure, since the traveling input device of the multifunctional vehicle is composed of a by-wire type input device, it is possible to prohibit autonomous traveling of the multifunctional vehicle during the execution of the remote driving mode. Therefore, it is possible to secure the safety of the multifunctional vehicle during the execution of the remote driving mode and the safety of a multifunctional vehicle driver as a remote operator.

According to the third aspect of the disclosure, the operation instruction information received during the execution of the remote driving mode is transmitted to the other vehicle. Therefore, it is possible to prevent the traveling assist device of the multifunctional vehicle from being operated during the execution of the remote driving mode and transmitting unneeded information to a pedestrian and the like around this vehicle.

According to the fourth aspect of the disclosure, the head tracking control by the wearable glasses is executed during the execution of the remote driving mode. Therefore, it is possible to assist the driver of the multifunctional vehicle as the remote operator to grasp a surrounding situation of the other vehicle. Therefore, in the remote driving using the wearable glasses, it is possible to improve the traveling safety of the other vehicle that is remotely driven.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
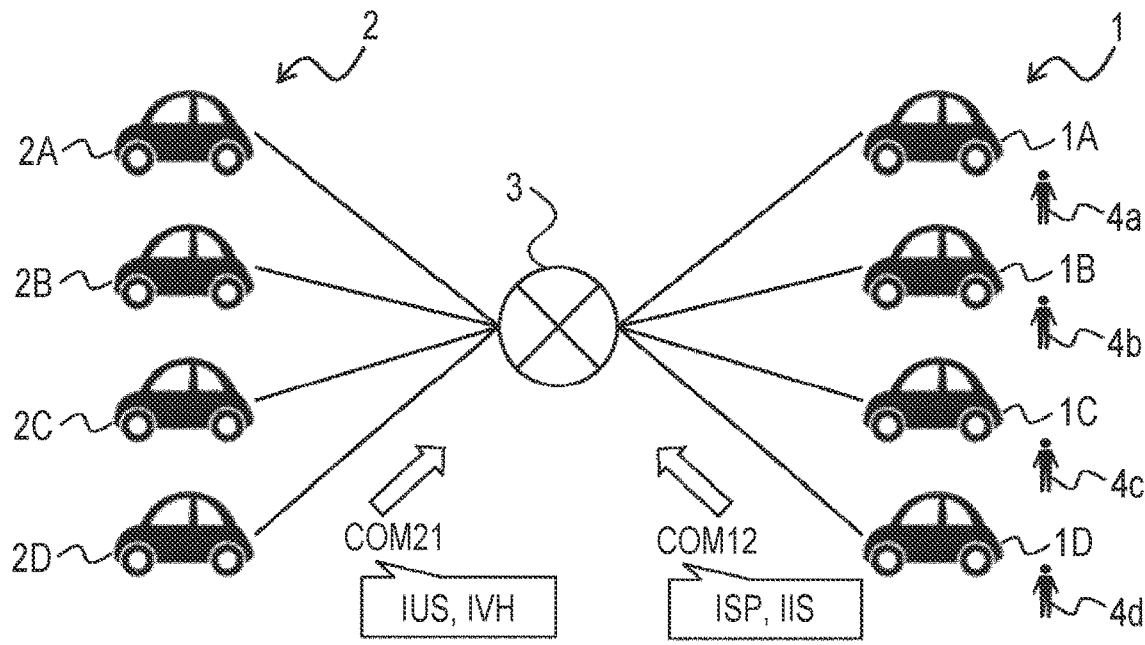
FIG. 1 is a diagram for describing a first example of a remote driving service.

In the following, a multifunctional vehicle according to an embodiment of the present disclosure and a remote driving method using the same will be described with reference to the drawings. Note that the remote driving method according to the embodiment is realized by computer processing in the multifunctional vehicle according to the embodiment. In addition, in each figure, the same or corresponding parts are designated by the same reference numerals to simplify or omit the description thereof.

1. Remote Driving Service

The multifunctional vehicle according to the embodiment constitutes a part of a system that provides a remote driving service. FIG. 1 is a diagram for describing a first example of the remote driving service. In FIG. 1, a plurality of vehicles 1 (1A to 1D) is shown. Each vehicle of the vehicles 1 is a vehicle on a side providing the remote driving service. In FIG. 1, a plurality of vehicles 2 (2A to 2D) is also shown. Each vehicle of the vehicles 2 is a vehicle on a side receiving the remote driving service. The vehicle 1 and the vehicle 2 communicate with each other via a network 3. In the example shown in FIG. 1, each vehicle of the vehicles 1 and the network 3 constitute the system that provides the remote driving service.

Each vehicle of the vehicles 1 corresponds to the "multifunctional vehicle" of the present application. Each vehicle of the vehicles 1 is, for example, a privately owned vehicle POV. Each vehicle of the vehicles 1 may be a vehicle owned by a business operator that provides the remote driving service. Each vehicle of the vehicles 1 travels by a manual operation of drivers 4 (4a to 4d) getting on the vehicle. That is, each vehicle of the vehicles 1 has an autonomous traveling function. A driving mode of the autonomous traveling vehicle 1 is set to a "normal driving mode". Each vehicle of the vehicles 1 may have a function of assisting the manual operation of the driver 4 or an autonomous driving function. In this case, the traveling of the vehicle 1 is executed by an in-vehicle driving assistance or autonomous driving system.

Each person of the drivers 4 remotely drives the vehicle 2 based on his/her own intention. In this case, each person of the drivers 4 acts as a remote operator of the vehicle 2. As a specific case, the vehicle 2 is considered as a vehicle, such as a taxi or a hired car, present in a remote location. In this case, each person of the drivers 4 utilizes a typical configuration of the vehicle 1, on which the driver 4 gets, to execute the remote driving (manual operation) of the vehicle 2. As described above, each vehicle of the vehicles 1 has a remote driving function in addition to the autonomous traveling function.

Each vehicle of the vehicles 2 corresponds to "another vehicle" of the present application. Each vehicle of the vehicles 2 is, for example, a privately owned vehicle POV. Each vehicle of the vehicles 2 may be a vehicle owned by a business operator that provides the remote driving service. Each vehicle of the vehicles 2 travels by a manual operation by a driver (not shown) getting on the vehicle. Each vehicle of the vehicles 2 may have a function of assisting the manual operation of the driver or an autonomous driving function. In this case, the traveling of the vehicle 2 is executed by an in-vehicle driving assistance or autonomous driving system. Each vehicle of the vehicles 2 has a configuration for receiving the manual operation by the remote operator. In a case where the remote operator executes the manual operation, each vehicle of the vehicles 2 travels by this manual operation.

In the example shown in FIG. 1, a case is considered in which one vehicle 2 desires to use the remote driving service. In this case, the vehicle 2 transmits communication information COM21 to each vehicle of the vehicles 1. The communication information COM21 includes, for example, usage desired information IUS and vehicle information IVH. The usage desired information IUS is information for requesting the remote driving (manual operation by the remote operator). The usage desired information IUS includes, for example, ID information (or IP address information) of the vehicle 2 and specification information (for example, specification information of a communication device, specification information of main equipment, such as powertrain and chassis, and specification information of a traveling assist device, such as a blinker, a windshield wiper, and a lamp) of the vehicle 2. An example of the vehicle information IVH will be described below.

In the example shown in FIG. 1, a case is further considered in which certain one driver 4 desires to provide the remote driving service. In this case, the driving mode of the vehicle 1 is set to a "remote driving mode". That is, in a case where the remote driving service is provided, the driving mode of the vehicle 1 is switched from the "normal driving mode" to the "remote driving mode". In the remote driving mode, the vehicle 1 accesses the network 3 automatically or based on an instruction from the driver 4 and acquires the communication information COM21. In a case where the specification information of the vehicle 2 matches specification information of the vehicle 1, the vehicle 1 transmits communication information COM12 to the vehicle 2. This communication information COM12 includes, for example, provision desired information ISP and driving instruction information IIS.

The provision desired information ISP is information for being responsible for the remote driving. The provision desired information ISP includes, for example, ID information (or IP address information) of the vehicle 1 and specification information (for example, specification information of a communication device, and specification information of a traveling assist device, such as a blinker, a windshield wiper, and a lamp) of the vehicle 1. The driving instruction information IIS includes, for example, control information of the vehicle 2 and operation information of a switch that switches an operation state of the traveling assist device. The control information is information for executing the remote driving of the vehicle 2. The control information is generated based on the operation information of the vehicle 1 by the driver 4 as the remote operator.

In a case where the communication information COM12 is transmitted from the vehicle 1 to the vehicle 2, the vehicle 2 recognizes a device (vehicle 1 in the example shown in FIG. 1) in charge of the remote driving thereof. Thereafter, the vehicle 2 and the vehicle 1 exchange the communication information COM12 and COM21 via the network 3. As a result, the driver 4 of the vehicle 1 executes the remote driving of the vehicle 2.

Figure 2:
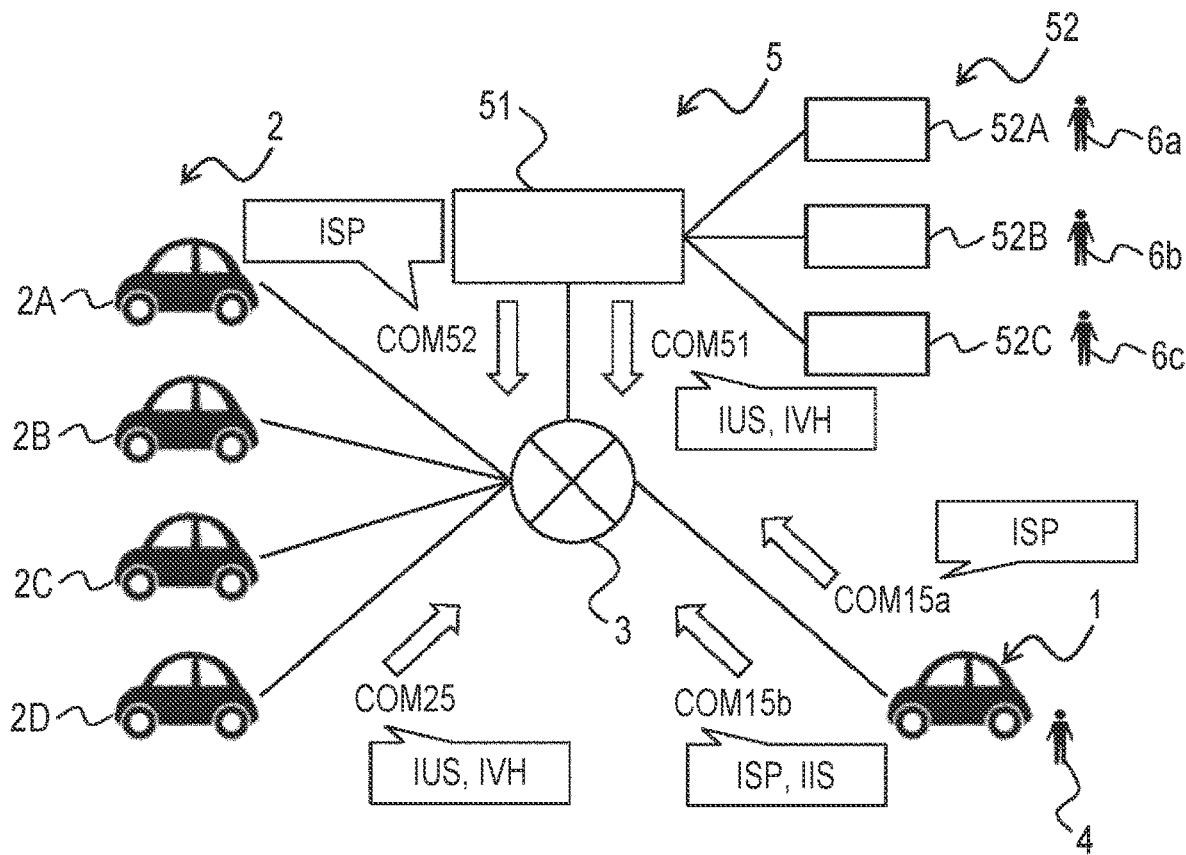
FIG. 2 is a diagram for describing a second example of the remote driving service.

FIG. 2 is a diagram for describing a second example of the remote driving service. In FIG. 2, one vehicle 1 and a remote facility 5 are shown. In the example shown in FIG. 2, one vehicle 1, the network 3, and the remote facility 5 constitute the system that provides the remote driving service. The remote facility 5 includes a management server 51 and a plurality of remote driving devices 52 (52A to 52C). The remote facility 5 is, for example, a business establishment that provides the remote driving service. The management server 51 manages the remote driving service. Each device of the remote driving devices 52 is assigned to a plurality of remote operators 6 (6a to 6c).

In the example shown in FIG. 2, a case is considered in which one vehicle 2 desires to use the remote driving service. In this case, the vehicle 2 transmits communication information COM25 to the management server 51. The communication information COM25 includes, for example, the usage desired information IUS and the vehicle information IVH. That is, the information included in the communication information COM25 is the same as the information included in the communication information COM21 shown in FIG. 1.

In the example shown in FIG. 2, a case is further considered in which the driver 4 desires to provide the remote driving service. In this case, the vehicle 1 transmits communication information COM15a to the management server 51 based on an instruction from the driver 4. This communication information COM15a includes, for example, the provision desired information ISP. The provision desired information ISP is as described in FIG. 1.

In a case where the usage desired information IUS is received from the vehicle 2, the management server 51 decides which of the vehicle 1 and the remote driving device 52 waiting for the remote driving will be in charge of the remote driving of this vehicle 2. For example, in a case where the specification information of the vehicle 2 (specifically, the specification information of the communication device and the traveling assist device) matches the specification information of the vehicle 1, the management server 51 decides the vehicle 1 to be in charge of the remote driving of the vehicle 2. Moreover, the management server 51 transmits communication information COM51 to the vehicle 1 and transmits communication information COM52 to the vehicle 2. The communication information COM51 includes information included in the communication information COM25 (that is, usage desired information IUS and vehicle information IVH). The communication information COM52 includes the information included in the communication information COM15a (that is, provision desired information ISP).

In a case where the communication information COM51 is transmitted from the management server 51 to the vehicle 1, the vehicle 1 recognizes the vehicle 2 to be remotely driven. On the other hand, in a case where the communication information COM52 is transmitted from the management server 51 to the vehicle 2, the vehicle 2 recognizes a device (vehicle 1 in the example shown in FIG. 2) in charge of the remote driving thereof. Thereafter, the vehicle 2 and the vehicle 1 exchange the communication information COM25 and COM15b via the management server 51. The communication information COM15b includes, for example, the driving instruction information IIS. The driving instruction information IIS is as described in FIG. 1. After the vehicle 2 and the vehicle 1 recognize each other, the vehicle 2 and the vehicle 1 may directly exchange the communication information without going through the management server 51.

In a case where the specification information of the vehicle 2 does not match the specification information of the vehicle 1, the management server 51 decides one remote driving device 52 to be in charge of the remote driving of the vehicle 2. In this case, the information included in the communication information COM25 is transmitted to the remote driving device 52 in charge of the remote driving of the vehicle 2.

Figure 3:
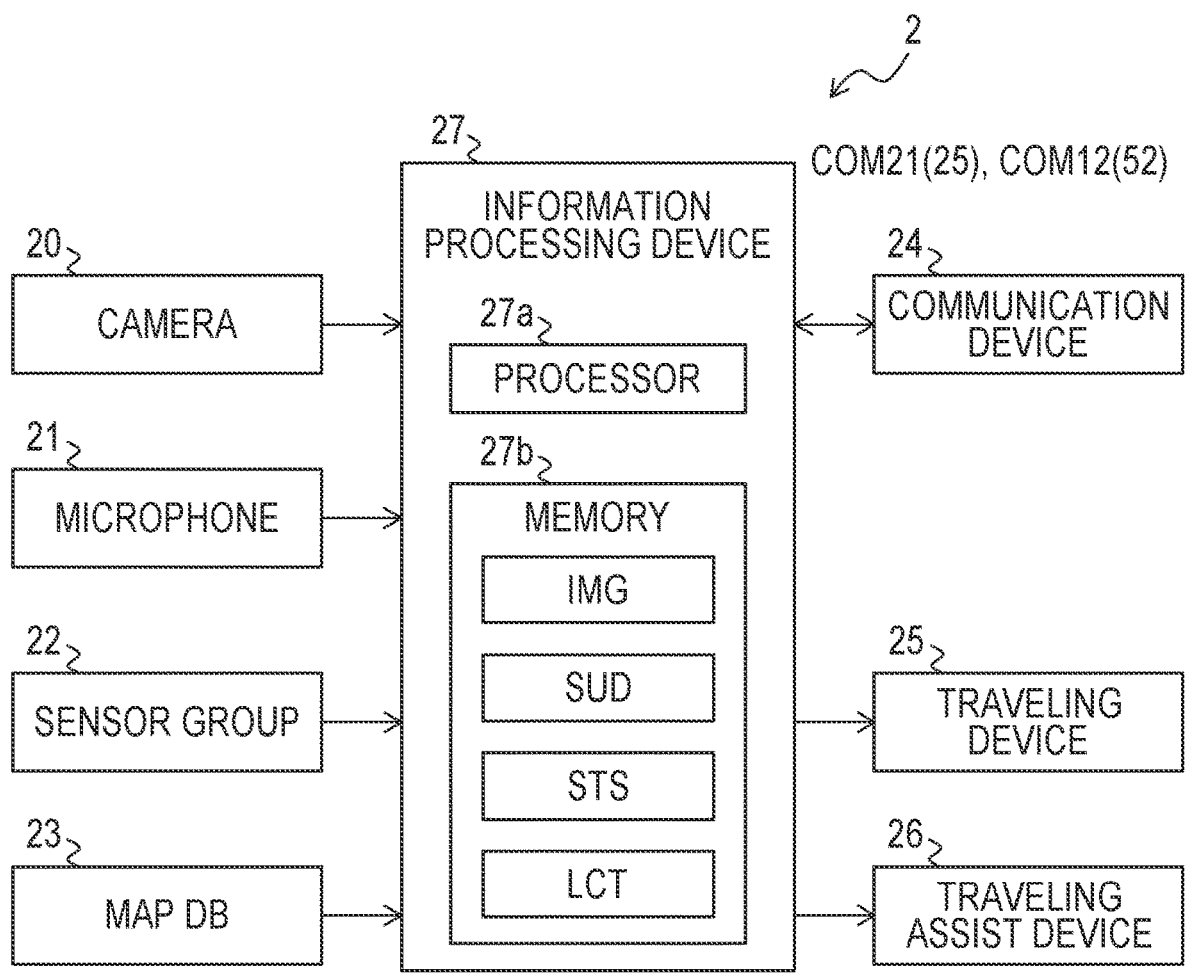
FIG. 3 is a block diagram showing a configuration example of a vehicle on a side receiving the remote driving service.

2. Configuration Example of Vehicle 2-1. Configuration Example of Vehicle (Another Vehicle) on Side Receiving Remote Driving Service FIG. 3 is a block diagram showing a configuration example common to each vehicle of the vehicles 2 shown in FIG. 1. The configuration example shown in FIG. 3 includes a camera 20, a microphone 21, a sensor group 22, a map database (DB) 23, a communication device 24, a traveling device 25, a traveling assist device 26, and an information processing device 27.

A plurality of cameras 20 is provided inside and outside the vehicle 2. The camera 20 captures a surrounding image of the vehicle 2. Examples of the surrounding image include a front center image, a right front image, a left front image, a right side image, a left side image, and a rear image. Surrounding image data is typically composed of moving image data. Note that the surrounding image data may be still image data. The camera 20 transmits the surrounding image data as surrounding image information IMG to the information processing device 27.

A plurality of microphones 21 is provided on an outer side surface of the vehicle 2. Each of the microphones 21 has directivity and records a surrounding sound of the vehicle 2. Examples of the surrounding sound include a right front sound, a left front sound, a right rear sound, and a left rear sound. Each of the microphones 21 transmits the surrounding sound data as surrounding sound information SUD to the information processing device 27.

The sensor group 22 includes a state sensor that detects a state of the vehicle 2. Examples of the state sensor include a speed sensor, an acceleration sensor, a yaw rate sensor, and a steering angle sensor. The sensor group 22 also includes a position sensor that acquires a position and a traveling direction of the vehicle 2. Examples of the position sensor include a global navigation satellite system (GNSS) sensor. The sensor group 22 transmits state data of the vehicle 2 to the information processing device 27 as state information STS. The sensor group 22 also transmits positional data and traveling direction data to the information processing device 27 as positional information LCT.

The sensor group 22 may include a recognition sensor other than the camera 20. The recognition sensor recognizes (detects) a target around the vehicle 2 by using radio waves or light. Examples of the recognition sensor include a millimeter wave radar and laser imaging detection and ranging (LIDAR).

Map information is stored in the map DB 23. Examples of the map information include information on a position of a road, information on a shape of a road (for example, a type of a curve and a straight line), and information on positions of an intersection and a structure. The map DB 23 is formed in an in-vehicle storage device (for example, a non-volatile recording medium, such as a hard disk and a flash memory). The map DB 23 may be formed in a computer (for example, an external server, such as the management server 51) capable of communicating with the vehicle 2.

The communication device 24 executes wireless communication with a base station (not shown) of the network 3. Examples of a communication standard of this wireless communication include a standard of mobile communication, such as 4G, LTE, or 5G. A connection destination of the communication device 24 includes at least the vehicle 1. In the example described in FIG. 2, the remote facility 5 (management server 51) is included in the connection destination of the communication device 24. In the communication with the vehicle 1, the communication device 24 transmits the communication information COM21 (or communication information COM25) received from the information processing device 27 to the vehicle 1 (or remote facility 5).

The traveling device 25 executes acceleration, deceleration, and steering of the vehicle 2. The traveling device 25 includes, for example, a driving device, a steering device, and a brake device. The driving device drives tires of the vehicle 2. The steering device steers the tires of the vehicle 2. The brake device applies braking force to the vehicle 2. The acceleration of the vehicle 2 is executed by the control of the driving device. The deceleration of the vehicle 2 is executed by the control of the brake device. In a case where the driving device is a motor, the braking of the vehicle 2 may be executed by using a regenerative brake controlled by the motor. The steering of the vehicle 2 is executed by the control of the steering device.

The traveling assist device 26 is a device that assists the traveling of the vehicle 2. Examples of the traveling assist device 26 include a blinker, alight (for example, the headlight and the fog lamp), the brake lamp, and the windshield wiper. The traveling assist device 26 is manually operated by the driver of the vehicle 2. In a case where the vehicle 2 has the function of assisting the manual operation of the driver or the autonomous driving function, the traveling assist device 26 is operated by the in-vehicle driving assistance or autonomous driving system.

The information processing device 27 is a computer that processes various pieces of information acquired by the vehicle 2. The information processing device 27 includes at least one processor 27a and at least one memory 27b. The processor 27a includes a central processing unit (CPU). The memory 27b is a volatile memory, such as a DDR memory, and expands various programs used by the processor 27a and transitorily stores various pieces of information. Various pieces of information acquired by the vehicle 2 are stored in the memory 27b. These various pieces of information include the surrounding image information IMG, the surrounding sound information SUD, the state information STS, and the positional information LCT. In a case where the vehicle 2 is remotely driven, the various pieces of information include the communication information COM12 (or COM25).

The processor 27a executes various controls relating to the traveling of the vehicle 2 by executing the program stored in the memory 27b. The processor 27a also determines whether or not the remote driving is needed by executing the program stored in the memory 27b. In a case where a determination is made that the remote driving is needed, the processor 27a generates the vehicle information IVH based on the various pieces of information stored in the memory 27b. The vehicle information IVH is composed of, for example, the surrounding image information IMG, the surrounding sound information SUD, and the positional information LCT. The state information STS may be added to the vehicle information IVH.

In a case where a determination is made that the remote driving is needed, the processor 27a encodes the usage desired information IUS and the vehicle information IVH and outputs the encoded usage desired information IUS and vehicle information IVH to the communication device 24. During the encoding processing, these pieces of information may be compressed. The encoded information is included in the communication information COM21 (or COM25).

Figure 4:
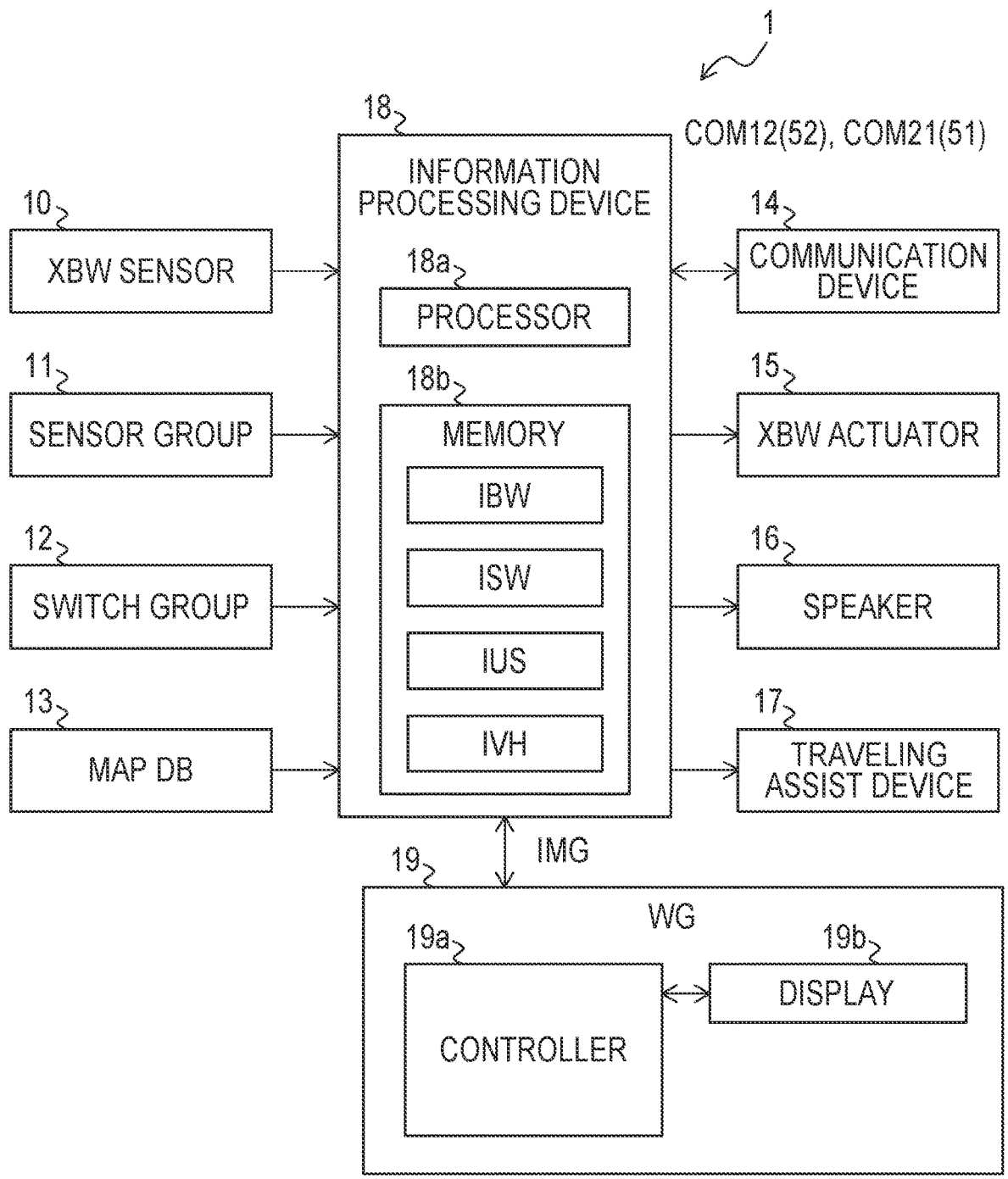
FIG. 4 is a block diagram showing a first configuration example of a vehicle on a side providing the remote driving service.

2-2. Configuration Example of Vehicle (Multifunctional Vehicle) on Side Providing Remote Driving Service FIG. 4 is a block diagram showing a first configuration example common to each vehicle of the vehicles 1 shown in FIG. 1. The configuration example shown in FIG. 4 includes an XBW sensor 10, a sensor group 11, a switch group 12, a map database (DB) 13, a communication device 14, an XBW actuator 15, a speaker 16, a traveling assist device 17, an information processing device 18, and wearable glasses (WG) 19.

The XBW sensor 10 is a sensor that acquires operation information IBW of the input device of an XBW type traveling device by the driver 4. Examples of the XBW type traveling device include a drive-by-wire (DBW), a brake-by-wire (BBW), a steer-by-wire (SBW), and a shift lever-by-wire (ShBW). The input device of the XBW type traveling device corresponds to a "traveling input device" of the present application.

An input device in the drive-by-wire is an accelerator pedal. The XBW sensor 10 in this case is a sensor that detects a depression amount of the accelerator pedal. An input device in the brake-by-wire is a brake pedal. The XBW sensor 10 in this case is a sensor that detects a depression amount of the brake pedal. An input device in the steer-by-wire is the steering wheel. The XBW sensor 10 in this case is a sensor that detects a steering angle of the steering wheel. An input device in the shift lever-by-wire is a shift lever. The XBW sensor 10 in this case is a sensor that detects a shift position. The XBW sensor 10 transmits the operation information IBW to the information processing device 27.

The sensor group 11 is a sensor other than the XBW sensor 10. Examples of the sensor group 11 include the same examples as the sensor group 22 described in FIG. 3.

The switch group 12 includes various switches manually operated by the driver 4. Examples of the various switches include an electric parking brake (EPB) switch, a blinker switch, a door lock switch, an air conditioner switch, a light switch, a brake lamp switch, a power window switch, a windshield wiper switch, and an ignition switch. The various switches include a driving mode switch that switches the driving mode.

The EPB switch switches an operation state (ON/OFF) of an EPB. The blinker switch switches an operation state (ON/OFF) of a direction indicator. The door lock switch switches a locked state (locked/unlocked) of a door of the vehicle 1. The air conditioner switch switches an operating state (operated/stopped) of an air conditioner. The light switch switches an operation state (ON/OFF) of the light (for example, the headlight and the fog lamp). The power window switch switches an operation state (open/closed) of a window provided on the door. The brake lamp switch switches an operation state (ON/OFF) of the brake lamp in conjunction with the operation of the brake pedal. The windshield wiper switch switches an operation state (ON/OFF) of the windshield wiper. The ignition switch switches an operation state (ON/OFF) of a power supply circuit of the vehicle. The driving mode switch switches the driving mode of the vehicle 1 between the normal driving mode and the remote driving mode.

Each switch in the switch group 12 transmits the operation information by the driver 4 to the information processing device 27. Here, the switch group 12 includes a switch that switches an operation state of the traveling assist device 17. Examples of such a switch include the blinker switch, the light switch, the brake lamp switch, and the windshield wiper switch. In the following, operation information of the switch that switches the operation state of the traveling assist device 17 is also referred to as "operation instruction information ISW".

The map information is stored in the map DB 13. Examples of the map information are the same as the examples of the map information stored in the map DB 23 described in FIG. 3.

The communication device 14 executes wireless communication with the base station (not shown) of the network 3. Examples of the communication standard of this wireless communication include the standard of mobile communication, such as 4G, LTE, or 5G. A connection destination of the communication device 14 includes at least the vehicle 2. In the example described in FIG. 2, the remote facility 5 (management server 51) is included in the connection destination of the communication device 14. In the communication with the vehicle 2, the communication device 14 transmits the communication information COM12 (or communication information COM15a and COM15b) received from the information processing device 18 to the vehicle 2 (or remote facility 5).

The XBW actuator 15 is an XBW type actuator that is operated based on an operation amount calculated based on the operation information IBW. An actuator in the drive-by-wire is, for example, a vehicle driving motor. An actuator in the brake-by-wire is, for example, a brake motor. An actuator in the steer-by-wire includes a motor installed on a steering side and a reaction force motor installed on a steering wheel side. An actuator in the shift lever-by-wire is, for example, an electrohydraulic actuator that is operated based on the operation information IBW.

The speaker 16 reproduces the surrounding sound data included in the surrounding sound information SUD. The surrounding sound data is recorded sound data in each orientation of the microphone 21. The surrounding sound data may be data subjected to processing, such as wave field synthesis. The surrounding sound data may be data obtained by cutting a sound other than a vehicle sound and an environmental sound recognized by data analysis. The vehicle sound that is a recognition target is a sound generated by the steering, the acceleration, or the deceleration. Examples of the sound generated by the steering include a stationary tire sound and a friction sound between the tire and a road surface. Examples of the sound generated by the acceleration include a rotation sound of the vehicle driving motor. Examples of the sound generated by the deceleration include a rotation sound of the vehicle driving motor and the friction sound between the tire and the road surface. Examples of the environmental sound that is the recognition target include an alert sound emitted by railroad crossing or a traffic light, an alert sound emitted by an emergency vehicle, and a warning sound emitted by the vehicle around the vehicle 2. The surrounding sound data may be pseudo data of the vehicle sound and the environmental sound recognized by the data analysis.

The traveling assist device 17 is a device that assists the traveling of the vehicle 1. Examples of the traveling assist device 17 include the blinker, the light (for example, the headlight and the fog lamp), the brake lamp, and the windshield wiper. The traveling assist device 17 is manually operated by the driver 4. In a case where the vehicle 1 has the function of assisting the manual operation of the driver 4 or the autonomous driving function, the traveling assist device 17 is operated by the in-vehicle driving assistance or autonomous driving system.

The information processing device 18 is a computer that processes various pieces of information relating to the vehicle control of the vehicle 1. The information processing device 18 is also a computer that processes various pieces of information relating to the remote driving of the vehicle 2. The information processing device 18 includes at least one processor 18a and at least one memory 18b. A basic configuration of the information processing device 18 is the same as a basic configuration of the information processing device 27 described in FIG. 3. Various programs and various pieces of information used by the processor 18a are stored in the memory 18b. These various pieces of information include the operation information IBW and the operation instruction information ISW. In a case where the remote driving of the vehicle 2 is executed, the usage desired information IUS and the vehicle information IVH (excluding the surrounding image information IMG) are stored in the memory 18b.

The processor 18a decodes the usage desired information IUS and the vehicle information IVH, and executes processing (transfer processing) of transferring the surrounding image information IMG included in the vehicle information IVH to the WG 19. The processor 18a also executes processing (reproduction processing) of reproducing the surrounding sound information SUD included in the vehicle information IVH on the speaker 16. In a case where the usage desired information IUS and the vehicle information IVH are compressed, these pieces of information are decompressed in decoding processing. The processor 18a further executes processing (transmission processing) of transmitting the driving instruction information IIS to the vehicle 2.

The WG 19 is a glasses-type or goggle-type terminal worn by the driver 4. In the example shown in FIG. 4, the WG 19 includes a controller 19a and a display 19b. The controller 19a executes short-range communication with the information processing device 18 to acquire the surrounding image information IMG included in the vehicle information IVH. Moreover, the controller 19a outputs the surrounding image data included in this surrounding image information IMG to the display 19b.

In a case where the surrounding image data is output, the controller 19a generates the image data output to the display 19b by a head tracking control. In the head tracking control, for example, the movement of a head HD of the driver 4 is detected by the acceleration sensor. Moreover, the image data output to the display 19b is generated in accordance with the movement of this head HD.

Figure 5:
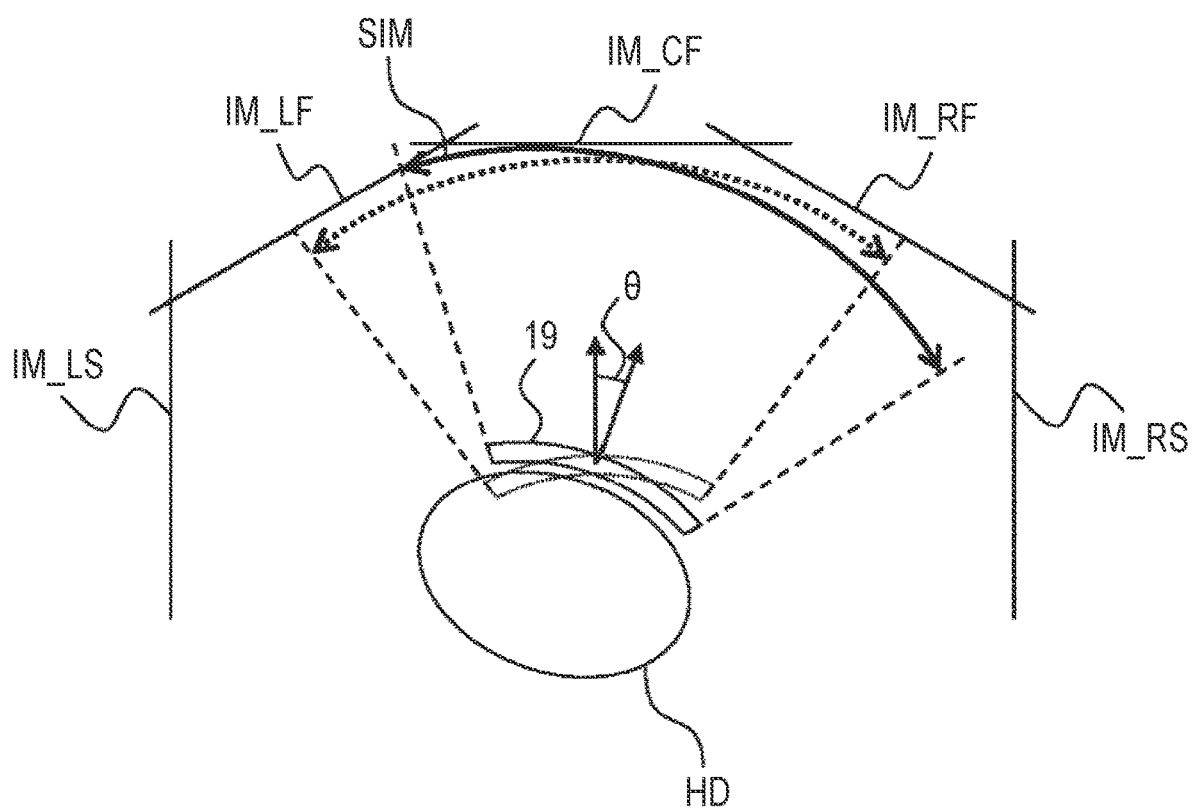
FIG. 5 is a diagram for describing a generation example of image data in a head tracking control.

FIG. 5 is a diagram for describing a generation example of the image data in the head tracking control. In the example shown in FIG. 5, a front center image IM_CFR, a right front image IM_RF, a left front image IM_LF, a right side image IM_RS, and a left side image IM_LS are shown as the surrounding images. The image data output to the display 19b is a composite image data SIM obtained by superimposing overlapping portions of two types of adjacent images.

In the head tracking control, in a case where the movement of the head HD in a right and left direction is detected, an inclination angle θ of the head HD with respect to a reference direction is specified. Moreover, the composite image data SIM is generated such that a reference position (for example, a center position) in the right and left direction of the image data output to the display 19b is shifted by a distance corresponding to the inclination angle θ. In the head tracking control, the composite image data SIM may be generated by detecting the movement of the head HD in an up and down direction in addition to the right and left direction.

Figure 6:
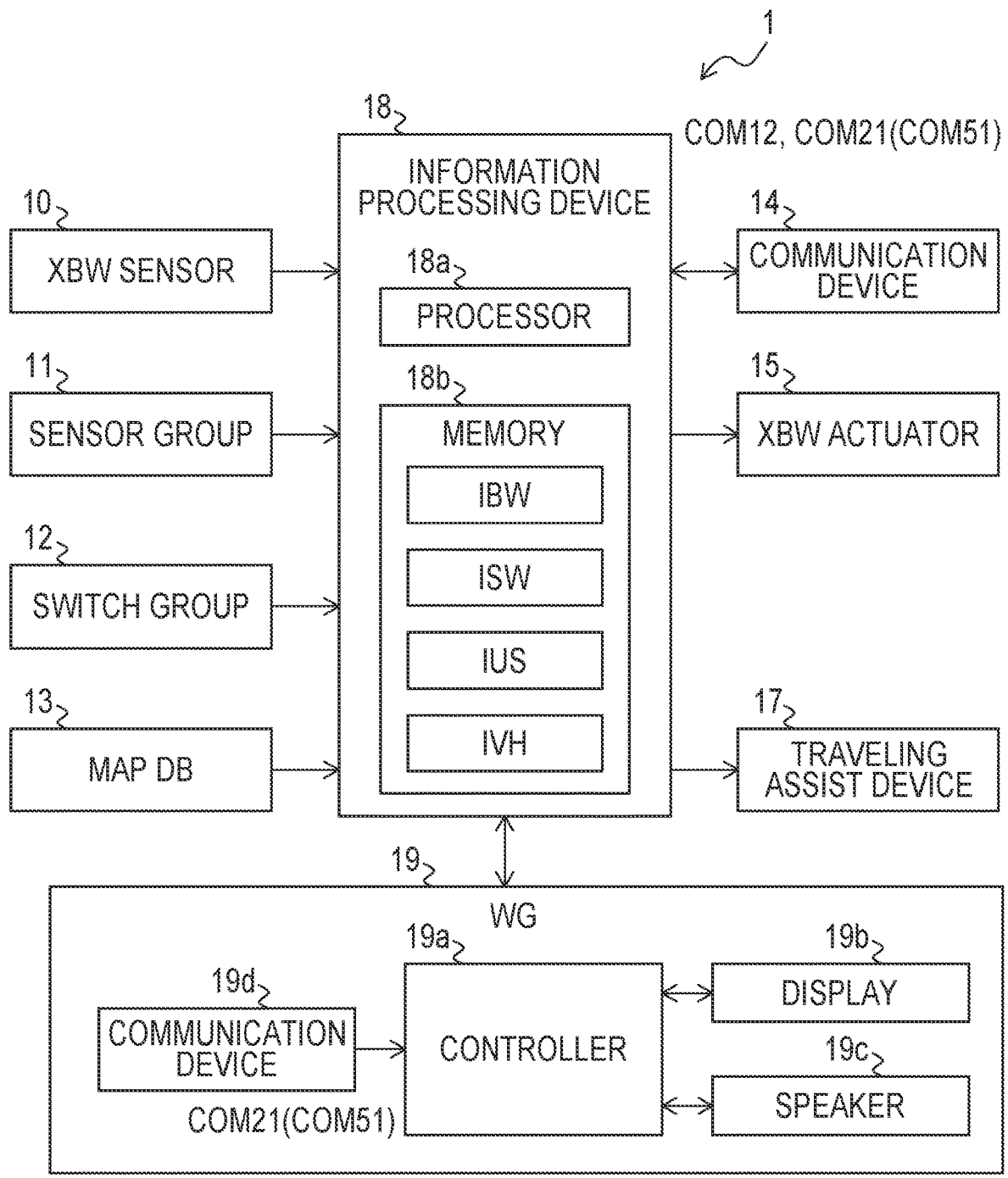
FIG. 6 is a block diagram showing a second configuration example of the vehicle on the side providing the remote driving service.

FIG. 6 is a block diagram showing a second configuration example common to each vehicle of the vehicles 1 shown in FIG. 1. The configuration example shown in FIG. 6 has elements common to the configuration example shown in FIG. 4. Therefore, the description of the common elements will be omitted. In the configuration example shown in FIG. 6, the WG 19 includes the controller 19a, the display 19b, a speaker 19c, and a communication device 19d.

A functional configuration of the speaker 19c is basically the same as a functional configuration of the speaker 16. A functional configuration of the communication device 19d is basically the same as a functional configuration of the communication device 14. That is, the configuration example shown in FIG. 6 includes the long-distance communication type WG 19 including a built-in speaker. With such a configuration example, the communication information COM21 (or COM51) from the vehicle 2 is provided to the information processing device 18 and the controller 19a. Therefore, unlike the configuration example shown in FIG. 4, the surrounding image information IMG is directly provided to the controller 19a without going through the information processing device 18. In addition, the surrounding sound information SUD is also directly provided to the controller 19a, and the surrounding sound data included in the surrounding sound information SUD is reproduced by the speaker 19c.

Note that, in the configuration example shown in FIG. 6, the WG 19 may have a configuration for executing short-range communication with the information processing device 18. In this case, the WG 19 may indirectly acquire the surrounding image information IMG and the surrounding sound information SUD via the information processing device 18. On the other hand, the information processing device 18 may indirectly acquire the usage desired information IUS and the vehicle information IVH (excluding the surrounding image information IMG and the surrounding sound information SUD) via the WG 19. The information processing device 18 may also provide the provision desired information ISP and the driving instruction information IIS to the vehicle 2 via the WG 19.

Figure 7:
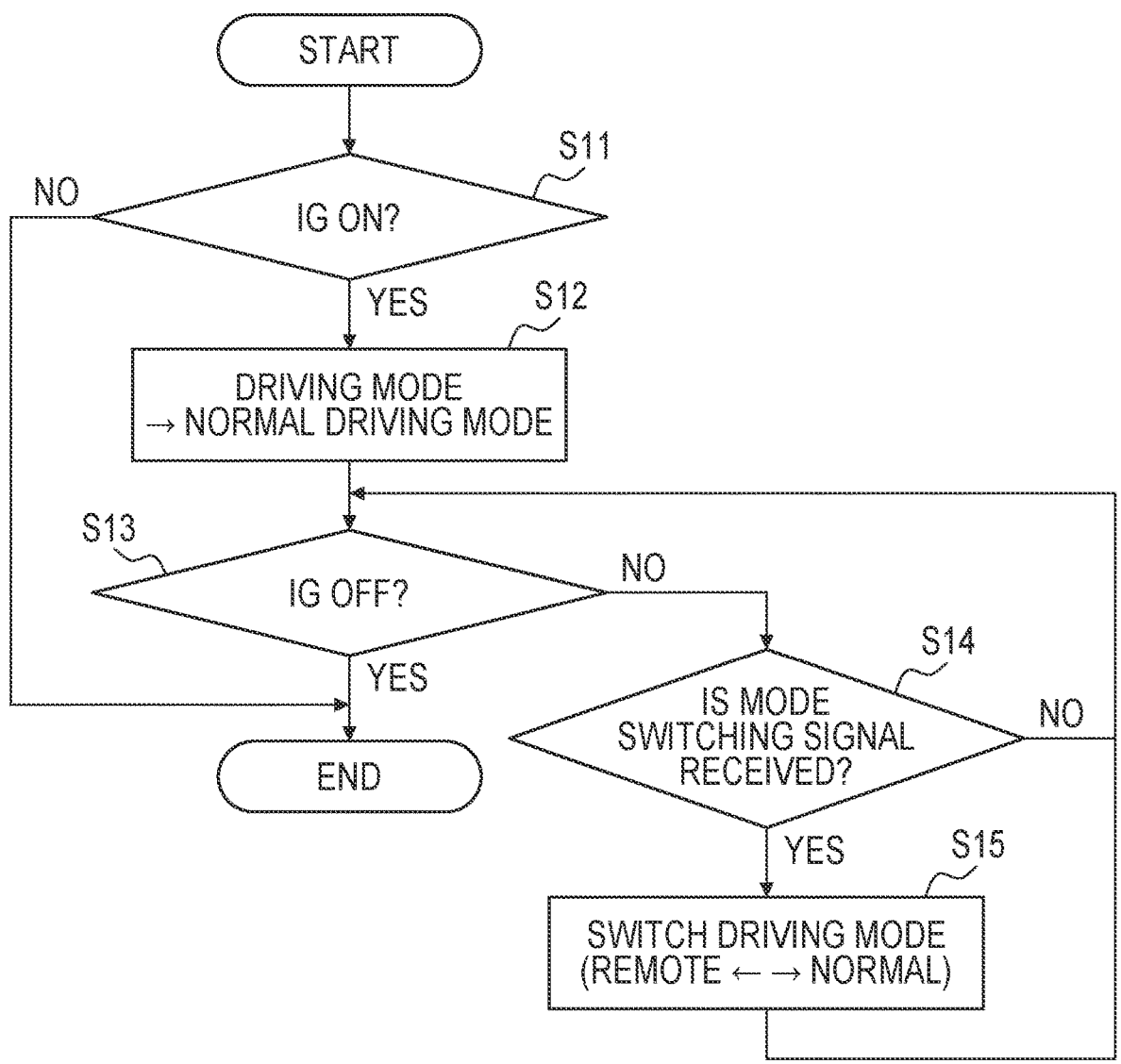
FIG. 7 is a flowchart showing a processing example executed by an information processing device of the vehicle on the side providing the remote driving service.
Figure 8:
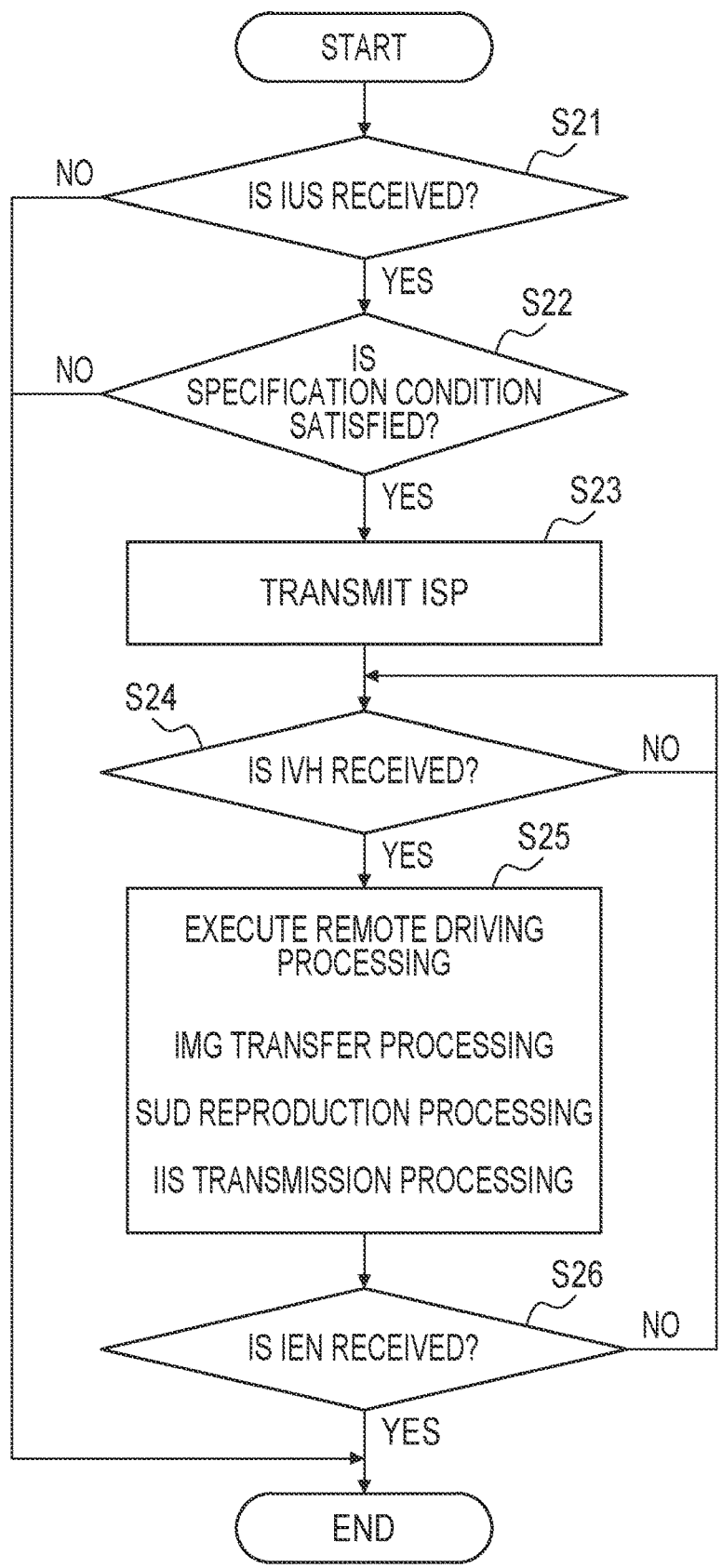
FIG. 8 is a flowchart showing a processing example executed by the information processing device of the vehicle on the side providing the remote driving service.

3. Information Processing Example of Vehicle (Multifunctional Vehicle) on Side Providing Remote Driving Service FIGS. 7 and 8 are flowcharts showing processing examples executed by the information processing device 18 (processor 18a). The routine shown in FIG. 7 is repeatedly executed at predetermined intervals. The routine shown in FIG. 8 is repeatedly executed at predetermined intervals while the driving mode of the vehicle 1 is set to the "remote driving mode".

In the routine shown in FIG. 7, first, a determination is made as to whether or not the ignition switch (IG) is set to the operation state (ON) (step S11). In a case where a determination result in step S11 is negative, this process is terminated. In a case where the determination result in step S11 is positive, the driving mode of the vehicle 1 is set to the normal driving mode (step S12).

Following the process in step S12, a determination is made as to whether or not the ignition switch is set to a non-operation state (OFF) (step S13). In a case where a determination result in step S13 is positive, this process is terminated. In a case where the determination result in step S13 is negative, a determination is made as to whether or not a mode switching signal is received (step S14). The mode switching signal is output in a case where the driving mode switch is manually operated by the driver 4.

In a case where a determination result in step S14 is positive, the switching of the driving mode is executed (step S15). In the process of step S15, the switching of the currently set driving mode (for example, the normal driving mode) is executed to the driving mode that is not currently set (for example, the remote driving mode). In a case where the determination result in step S14 is negative, the process of step S13 is executed.

In the routine shown in FIG. 8, first, a determination is made as to whether or not the usage desired information IUS is received (step S21). In a case where a determination result in step S21 is negative, this process is terminated. In a case where the determination result in step S21 is positive, a determination is made as to whether or not a specification condition is satisfied (step S22). In the process of step S22, the specification information (specifically, the specification information of the communication device and the traveling assist device) of the vehicle 1 is compared with the specification information of the vehicle 2 included in the usage desired information IUS. In a case where both pieces of information match, a determination is made that the specification condition is satisfied.

In a case where a determination result in step S22 is positive, the provision desired information ISP is transmitted (step S23). A transmission destination of the provision desired information ISP is the vehicle 2 to which the usage desired information IUS is transmitted. The vehicle 2 to which the usage desired information IUS is transmitted is specified by the ID information (or IP address information) of the vehicle 2.

Following the process in step S23, a determination is made as to whether or not the vehicle information IVH is received (step S24). The process of step S24 is repeatedly executed until a positive determination result is obtained.

In a case where a determination result in step S24 is positive, remote driving processing is executed (step S25). The remote driving processing includes the transfer processing of the surrounding image information IMG, the reproduction processing of the surrounding sound information SUD, and the transmission processing of the driving instruction information IIS. In the remote driving processing, the transfer processing, the reproduction processing, and the transmission processing are executed in parallel.

In the transfer processing, the surrounding image information IMG included in the vehicle information IVH acquired in the process of step S24 is transmitted to the WG 19.

In the reproduction processing, the surrounding sound data reproduced by the speaker 16 is generated based on the surrounding sound information SUD included in the vehicle information IVH acquired in the process of step S24. In the reproduction processing, the surrounding sound data included in the surrounding sound information SUD may be reproduced as it is, or the data subjected to the processing, such as wave field synthesis, may be reproduced. In the reproduction processing, the surrounding sound data included in the surrounding sound information SUD may be analyzed. In this case, the pseudo data of the vehicle sound and the environmental sound recognized as a result of the analysis may be reproduced instead of the surrounding sound data.

In the transmission processing, for example, a determination is made as to whether or not the operation information IBW or the operation instruction information ISW is received. In a case where a determination is made that the operation information IBW is received, the control information is generated based on this operation information IBW. This control information is transmitted as the driving instruction information IIS. In a case where a determination is made that the operation instruction information ISW is received, this operation instruction information is transmitted as the driving instruction information IIS.

Following the process of step S25, a determination is made as to whether or not a driving termination information IEN is received (step S26). The driving termination information IEN is transmitted from the vehicle 2 to the vehicle 1 in a case where, for example, the vehicle 2 receiving the remote driving service desires to terminate the usage. In another example, the driving termination information IEN is transmitted from the vehicle 2 to the vehicle 1 in a case where the vehicle 2 reaches a destination. In still another example, the driving termination information IEN is generated in a case where the driver 4 desires to terminate the provision of the remote driving service and operates the driving mode switch.

In a case where a determination result in step S26 is positive, this process is terminated. In a case where a determination result in step S26 is negative, the process of step S24 is executed. That is, the processes of steps S24 to S26 are repeatedly executed until a positive determination result is made in the process of step S26.

Note that the routine shown in FIG. 8 corresponds to a processing example in a case where the remote driving service shown in FIG. 1 is implemented. As a processing example in a case where the remote driving service shown in FIG. 2 is implemented, a routine is used in which processes of steps S22 and S23 are deleted from the routine shown in FIG. 8 and the "reproduction processing" of the surrounding sound information SUD of the process of step S25 is replaced with the "transfer processing" (transfer destination is the WG 19). Therefore, the description of this processing example will be omitted.

4. Effects

According to the embodiment described above, in the vehicle 1 in which the WG 19 is added to the typical configuration for realizing the autonomous traveling function, the remote driving of the vehicle 2 based on the switching of the driving mode is executed. Therefore, it is possible to provide the remote driving service utilizing the typical configuration of the general vehicle.

In addition, according to the embodiment, since the traveling device of the vehicle 1 is composed of the XBW type traveling device, it is possible to prohibit the autonomous traveling of the vehicle 1 during the execution of the remote driving mode. Therefore, it is possible to secure the safety of the vehicle 1 during the execution of the remote driving mode and the driver 4 as the remote operator. Further, according to the embodiment, the operation instruction information ISW received during the execution of the remote driving mode is transmitted to the vehicle 2. Therefore, it is possible to prevent the traveling assist device 17 from being operated during the execution of the remote driving mode and transmitting unneeded information to a pedestrian and the like around the vehicle 1. In addition, according to the embodiment, the head tracking control is executed by the controller 19a. Therefore, it is possible to assist the driver 4 as the remote operator to grasp a surrounding situation of the vehicle 2. Therefore, in the remote driving using WG 19, it is possible to improve the traveling safety of the vehicle 2 that is remotely driven.

What is claimed is:

1. A multifunctional vehicle with an autonomous traveling function and a function of remotely driving another vehicle, the multifunctional vehicle comprising:
   a traveling input device operated by a driver of the multifunctional vehicle;
   an information processing device configured to process operation information of the traveling input device by the driver;
   wearable glasses worn by the driver and configured to communicate with the other vehicle by at least one of direct communication with the other vehicle and indirect communication via the information processing device; and
   a communication device configured to transmit communication information to the other vehicle, in a case where specification information of the other vehicle matches specification information of the multifunctional vehicle, wherein the specification information includes one or more of specification information of a communication device, specification information of main equipment of the multifunctional vehicle or the other vehicle, wherein the main equipment includes one or more of a powertrain and a chassis, and specification information of a traveling assist device, wherein the traveling assist device includes one or more of a blinker, a windshield wiper, and a lamp, wherein:
   the information processing device is configured to switch and execute a normal driving mode for driving the multifunctional vehicle and a remote driving mode for driving the other vehicle;
   in the normal driving mode, a vehicle control of the multifunctional vehicle is executed using control information generated based on the operation information;
   in the remote driving mode, the control information is transmitted to the other vehicle via the communication device; and
   the wearable glasses are configured to display a surrounding image of the other vehicle acquired by at least one of the direct communication and the indirect communication with the other vehicle during execution of the remote driving mode by the information processing device.

2. The multifunctional vehicle according to claim 1, further comprising:
   a driving device;
   a brake device; and
   a steering device, wherein:
   the traveling input device includes an accelerator pedal, a brake pedal, a steering wheel, and a shift lever;
   the driving device and the accelerator pedal constitute a drive-by-wire;
   the brake device and the brake pedal constitute a brake-by-wire;
   the steering device and the steering wheel constitute a steer-by-wire; and
   the shift lever constitutes a shift lever-by-wire.

3. The multifunctional vehicle according to claim 1, further comprising:
   a traveling assist device configured to assist traveling of the multifunctional vehicle; and
   a switch operated by the driver of the multifunctional vehicle to operate the traveling assist device, wherein:
   in the normal driving mode, operation instruction information from the switch is output to the traveling assist device; and
   in the remote driving mode, the operation instruction information is transmitted to the other vehicle via the communication device.

4. The multifunctional vehicle according to claim 1, wherein:
   the surrounding image includes a front image, a left front image, and a right front image of the other vehicle; and
   the wearable glasses are configured to execute a head tracking control of generating an image displayed on the wearable glasses in accordance with movement of a head of the driver based on the surrounding image during the execution of the remote driving mode.

5. A remote driving method of remotely driving another vehicle using a multifunctional vehicle with an autonomous traveling function and a function of remotely driving the other vehicle, the remote driving method comprising:
   a step of setting a driving mode of the multifunctional vehicle to a remote driving mode for driving the other vehicle;
   a step of displaying a surrounding image of the other vehicle acquired by at least one of direct communication and indirect communication with the other vehicle on wearable glasses worn by a driver of the multifunctional vehicle while the driving mode is set to the remote driving mode;
   a step of transmitting communication information using a communication device to the other vehicle, in a case where specification information of the other vehicle matches specification information of the multifunctional vehicle, wherein the specification information includes one or more of specification information of a communication device, specification information of main equipment of the multifunctional vehicle or the other vehicle, wherein the main equipment includes one or more of a powertrain and a chassis, and specification information of a traveling assist device, wherein the traveling assist device includes one or more of a blinker, a windshield wiper, and a lamp; and
   a step of transmitting control information generated based on operation information of a traveling input device operated by the driver to the other vehicle while the driving mode is set to the remote driving mode.

* * * * *